(12) United States Patent
Zhang et al.

(10) Patent No.: US 10,567,297 B2
(45) Date of Patent: Feb. 18, 2020

(54) MAXIMUM TRANSMISSION UNIT SIZE SELECTION FOR WIRELESS DATA TRANSFER

(71) Applicants: AT&T Intellectual Property I, L.P., Atlanta, GA (US); AT&T Mobility II LLC, Atlanta, GA (US)

(72) Inventors: Ming Zhang, Bellevue, WA (US); Jianchun Zhou, Bellevue, WA (US); Sameer Sangal, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/939,892

(22) Filed: Mar. 29, 2018

(65) Prior Publication Data

US 2019/0306072 A1    Oct. 3, 2019

(51) Int. Cl.
*H04L 12/805* (2013.01)
*H04B 17/318* (2015.01)
*H04W 24/10* (2009.01)

(52) U.S. Cl.
CPC ......... *H04L 47/365* (2013.01); *H04B 17/318* (2015.01); *H04W 24/10* (2013.01)

(58) Field of Classification Search
CPC ......... H04W 52/0229; H04W 52/0225; H04W 52/0245; H04W 52/245; H04W 24/00; H04W 28/04; H04B 7/0417; H04L 47/36; H04L 47/365; H04L 43/10; H04L 45/64; H04L 45/70; H04L 47/12; H04L 69/166; H04L 1/00; H04L 1/0007; H04L 43/0829
See application file for complete search history.

(56) References Cited

U.S. PATENT DOCUMENTS

| 8,085,810 B2 | 12/2011 | Kovvali et al. |
| 8,493,875 B2 | 7/2013 | Russell |
| 9,294,409 B2 | 3/2016 | Zhao et al. |

(Continued)

OTHER PUBLICATIONS

Sarolahti, et al., "F-RTO: an enhanced recovery algorithm for TCP retransmission timeouts," ACM SIGCOMM Computer Communication Review, 312 (2003): pp. 51-63.

*Primary Examiner* — Kan Yuen
(74) *Attorney, Agent, or Firm* — Amin, Turocy & Watson, LLP

(57) ABSTRACT

The described technology is generally directed towards selecting, by user equipment, a selected maximum transmission unit (MTU) packet size for wireless data transfer based on radio signal conditions. In one aspect, reference signal received power (RSRP) and reference signal received quality (RSRQ) are used to select the MTU packet size, e.g., by using RSRP and RSRQ as indices to a lookup table of predetermined MTU packet sizes, such as previously determined by field testing. In general, smaller MTU packet sizes are used with poorer quality radio signal conditions. The selected MTU packet size may be increased or decreased based on actual performance data and/or based on changed radio signal conditions, such as for a subsequent data transfer session. The user equipment may comprise a Cat-M device that transfers data related to Machine-Type Communications (MTC)/Machine to Machine (M2M) communications.

20 Claims, 11 Drawing Sheets

(56) References Cited

U.S. PATENT DOCUMENTS

| | | | |
|---|---|---|---|
| 2011/0276851 A1* | 11/2011 | Nagaraja | H04L 1/1607 |
| | | | 714/748 |
| 2015/0036511 A1* | 2/2015 | Cheng | H04W 28/04 |
| | | | 370/242 |
| 2015/0098349 A1* | 4/2015 | Wei | H04W 16/14 |
| | | | 370/252 |
| 2016/0227514 A1* | 8/2016 | Burbidge | H04W 68/08 |
| 2016/0338089 A1 | 11/2016 | Vos | |
| 2017/0339681 A1 | 11/2017 | Hussain et al. | |
| 2017/0347351 A1 | 11/2017 | Cai et al. | |
| 2017/0359829 A1 | 12/2017 | Tabet et al. | |
| 2018/0034736 A1 | 2/2018 | Anchan et al. | |
| 2018/0041415 A1 | 2/2018 | Nitinawarat et al. | |
| 2018/0063747 A1 | 3/2018 | Anchan et al. | |

* cited by examiner

MAXIMUM TRANSMISSION UNIT SIZE SELECTION FOR WIRELESS DATA TRANSFER

TECHNICAL FIELD

The subject application is related to wireless communication systems, and, for example, to dynamic selection of a maximum transmission unit (MTU) packet size for wireless communications, such as for use in category-M (cat-M) devices.

BACKGROUND

In LTE wireless communication systems, machine-type communications (MTC), including massive machine-type communications, refers to machine devices communicating with one another through wireless networks. Category-M devices (cat-M devices, sometimes referred to as LTE-M devices) typically refer to user equipment machines that are part of the Internet of Things (IoT) and communicate relatively small amounts of data with other machines via a wireless LTE network using the Transmission Control Protocol (TCP)/Internet Protocol (IP). Examples of Category-M devices include smart metering devices, sensors, healthcare devices, wearables and the like.

For MTC data transmission, the IP packet is broken into smaller radio resource blocks (RBs); the maximum number of RBs assigned to Cat-M devices is six, shared with other Cat-M devices at the time domain. If any one of the radio blocks is not received, the TCP packet cannot be reassembled, and retransmission of the radio block is required. Under poor radio signal conditions, because of radio block retransmissions and TCP server timeout, when two or more Cat-M devices concurrently download/upload data, the TCP session failure rate is high.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
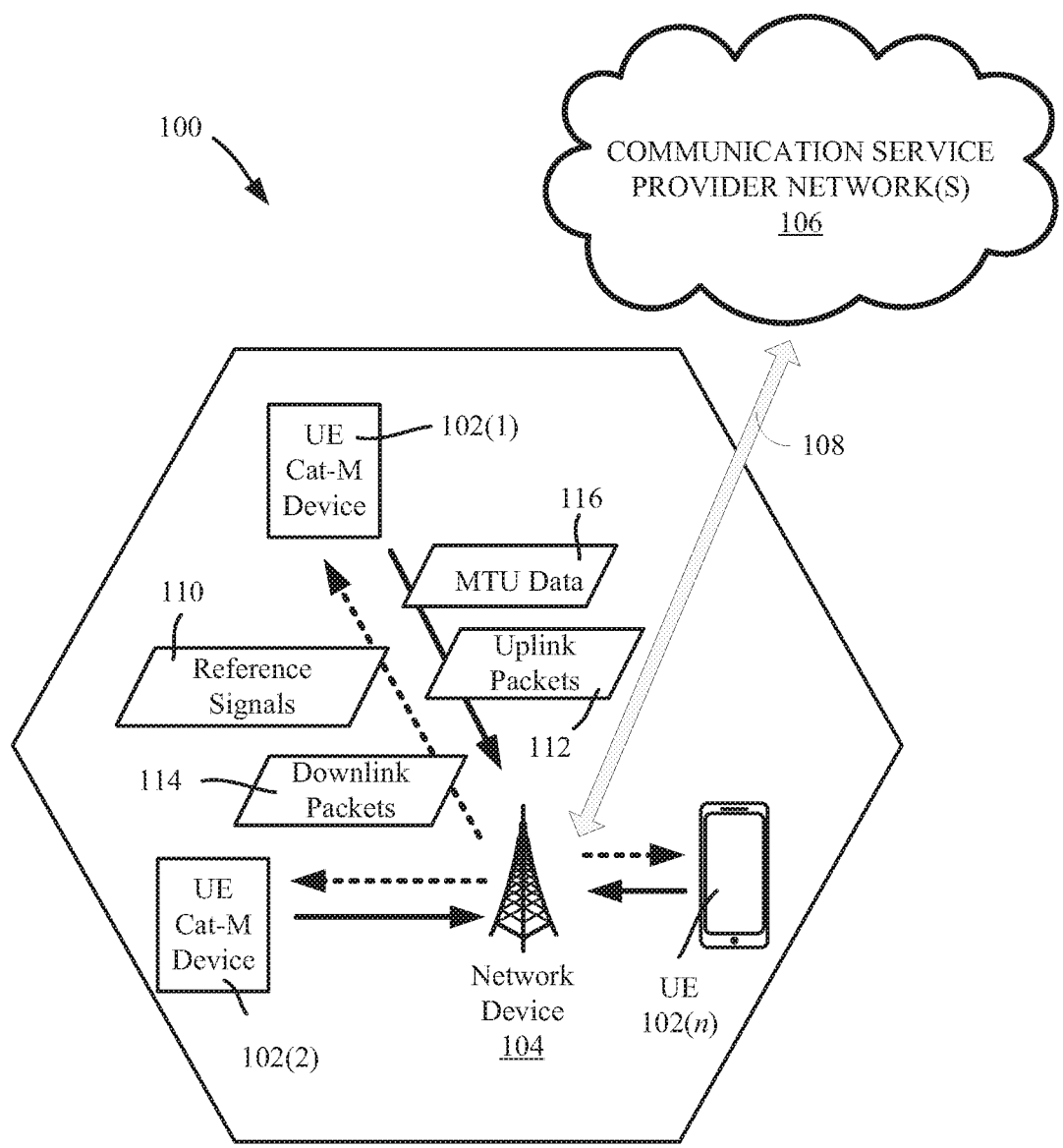
FIG. 1 illustrates an example wireless communication system in which a network node device (e.g., network device) and various user equipment (UE), including a UE operating as a local manager, can implement various aspects and implementations of the subject disclosure.

Briefly, one or more aspects of the technology described herein are generally directed towards dynamically selecting a user equipment device's maximum transmission unit (MTU) packet size based on radio signal conditions. For example, the technology operates to use a smaller MTU size when radio signal conditions are relatively poor, and use a larger MTU size when signal conditions are relatively good. This reduces the TCP round trip time, and improves MTC device communication performance.

As described herein, under poor radio signal conditions, a smaller MTU size is selected for use, which reduces the number of radio blocks needed for transmitting a TCP packet. This in turn reduces the TCP retransmission rate and time out rate, and thus reduces data download/upload failures, including for Cat-M devices, due to the limited radio resources available and the long round trip delays that otherwise result from a large number of repetitions. The mapping of radio signal conditions to a suitable MTU size can be established by field testing or the like.

In sum, the technology described herein of selective MTU sizes based on radio signal conditions reduces the TCP packet retransmission rate and session time out rate, and therefore improves the data transfer (download/upload) success rate.

It should be understood that any of the examples and terms used herein are non-limiting. For instance, while Cat-M devices are examples of devices, the technology is not limited to Cat-M, but rather the technology may provide benefits with Cat-0, Cat-1, LTE-M, NB-IoT, EC-GSM, and New Radio (NR, sometimes referred to as 5G) applications. Further, any wireless-capable user equipment may benefit from the technology described herein, including smartphones, tablets, notebooks, modems (cards, dongles/adapters (e.g., USB)) and so on. Thus, any of the examples herein are non-limiting examples, and any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type communication(s) (MTC) user equipment or user equipment capable of machine to machine (M2M) communication, PDA, Tablet, mobile terminals, smart phone, laptop embedded equipped (LEE), laptop mounted equipment (LME), USB dongles etc.

FIG. 1 illustrates an example wireless communication system 100 in accordance with various aspects and embodiments of the subject technology. In one or more embodiments, the system 100 can comprise one or more user equipment UEs 102(1)-102(n). One or more of the user equipments (e.g., 102(1) and 102(2)) can be Cat-M devices or the like.

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UEs 102 to the network device 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the user equipment 102 and the network device 104). While example embodiments might be described for 4G LTE and 5G new radio (NR) systems, the embodiments can be applicable to any radio access technology (RAT) or multi-RAT system where the user equipment operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the user equipments 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In FIG. 1, as described herein, a user equipment (e.g., 102(1)) is configured to determine radio signal conditions based on radio reference signals 110 from the network device 104. Based on the radio signal conditions, the user equipment (e.g., 102(1)) selects an MTU packet size as described herein for use in sending uplink packets 112 and/or receiving downlink packets 114. So that the network device knows the MTU size to use for downlink packets, in the example implementation of FIG. 1, at least for download data transfers, the user equipment sends MTU data 116 to the network device.

Figure 2:
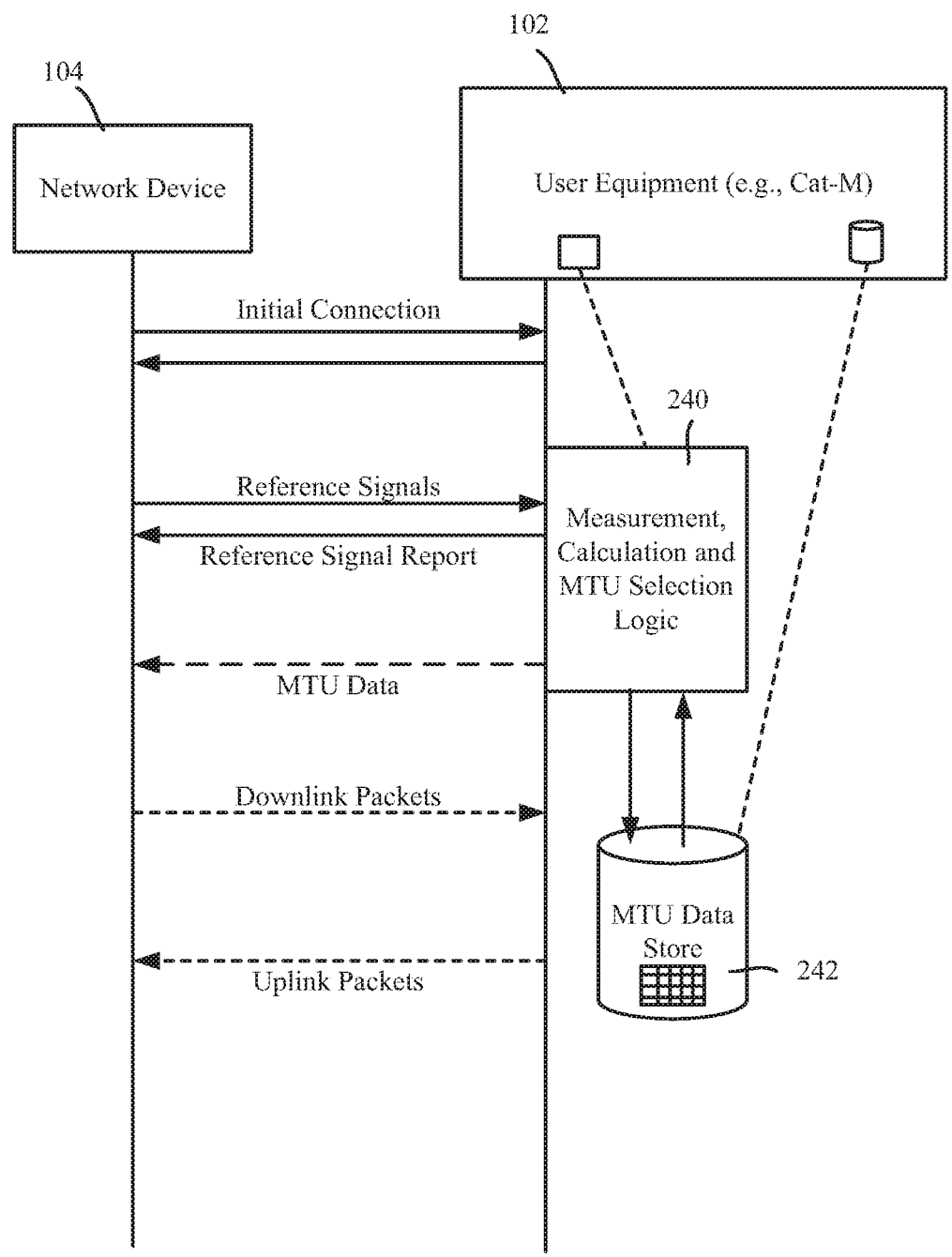
FIG. 2 illustrates an example communications sequence including communications to select a maximum transmission unit (MTU) packet size based on radio signal conditions, in accordance with various aspects and implementations of the subject disclosure.

FIG. 2 shows timing/data communications between a network device 104 and a user equipment 102. After an initial connection, the network device sends reference signals to the user equipment. The user equipment 102 typically measures and returns a reference signal report to the network device.

As represented in FIG. 2, the user equipment 102 comprises measurement, calculation and MTU selection logic 240, which based on the received reference signals from the network device 104, determines the radio signal conditions and selects an MTU packet size for data transfers as described herein. In one or more implementations, the user equipment's logic 240 measures the reference signal received power (RSRP) data corresponding to a power of a reference signal, and measures (that is, computes) the reference signal received quality (RSRQ) data corresponding to a received quality of the reference signal. In general, these measurements (generally related to the current signal-to-interference-plus-noise ratio (SINR)) are well known and not described herein in detail, except to note that the "measured" RSRQ is computed from the RSRP, RSSI (Received Signal Strength Indicator) and the number of used resource blocks (N): RSRQ=(N*RSRP)/RSSI, measured over the same bandwidth as RSRP and RSSI.

In one or more implementations, with the RSRP and RSRQ values, the measurement, calculation and MTU selection logic 240 of the user equipment 102 obtains a MTU packet size, e.g., from an MTU data store 242. It is also feasible to calculate the MTU size as a function of the RSRP and RSRQ values. If the network device 104 needs to know the MTU packet size, e.g., for download data transfers, the packet size can be returned as MTU data to the network device. Note that the RSRP and RSRQ values can be returned in the reference signal report to the network device, in which event the network device can similarly determine the MTU packet size, (provided that there are not different data stores 242 or functions for different types of user equipments).

Figure 3:
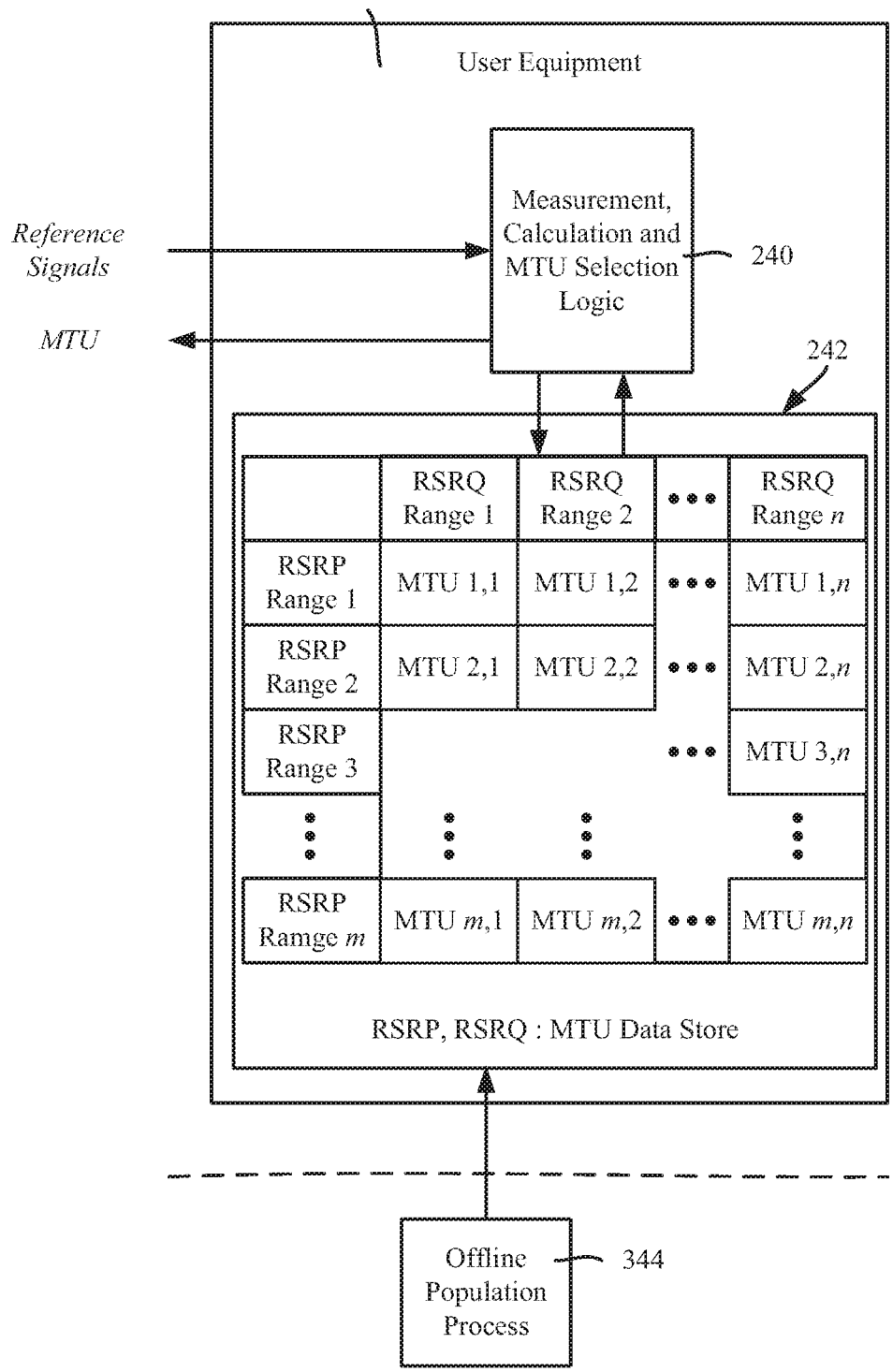
FIG. 3 illustrates an example of selecting an MTU packet size from a data store (table) based on received reference signals, in accordance with various aspects and implementations of the subject disclosure.

As generally represented in FIG. 3, in one or more implementations, the data store 242 comprises a two-dimensional array/lookup table. Given the RSRP and RSRQ values, each of which can be rounded/quantized into a range or the like, indices to the lookup table are obtained and used to select the MTU packet size.

In general, analysis of data transfers shows that the extended acknowledgement delay is influenced by larger IP packet size (1500 bytes) being broken into a large number of smaller radio blocks. If any one of the radio blocks is not received by a user equipment, the TCP packet cannot be reassembled, and retransmission of the radio block is required. When another Cat-M user is downloading the data at the same time in the same cell, the TCP server time out rate can be very high. In order to reduce server time out rate (increase data download success rate), described herein is reducing the MTU size when the signal quality is poor. For example, for one IP packet of 1500 bytes, the IP packet is broken into smaller radio block for transmission, totaling about 20 radio blocks. If any one of the radio blocks has a transmission error, the radio block are retransmitted, up to 32 additional times, which gives minimum of a 256 millisecond retransmission delay. If retransmission fails, RLC (Radio Link Control) retransmission starts. The technology described herein reduces the number of radio blocks required for a TCP packet under poor radio signal conditions, by setting the MTU size dynamically based on the radio signal conditions. Under poor radio signal conditions, a smaller MTU size is assigned, whereby the total transmission time is reduced, which in turns reduces the TCP retransmission rate and time out rate.

The mapping of radio signal conditions to each of the MTU sizes for populating the data store 242 can be established by (prior offline) field testing, as represented in FIG. 3 by the offline population process 344. For example, to build the MTU and RSRP/RSRQ (Reference Signal Received Power/Reference Signal Received Quality) mapping data store 242, field testing can vary the MTU size (e.g., from 500 to 1500 bytes in steps of 100 bytes), and find the TCP IP packet retransmission rate as a function of RSRP and RSRQ. This can be repeated for two and more concurrent Cat-M devices, for example. The MTU size can then be optimized according to optimization criteria, such as optimized to minimize the retransmission rate and to minimize the TCP session time out rate at the cell edge.

Figure 4:
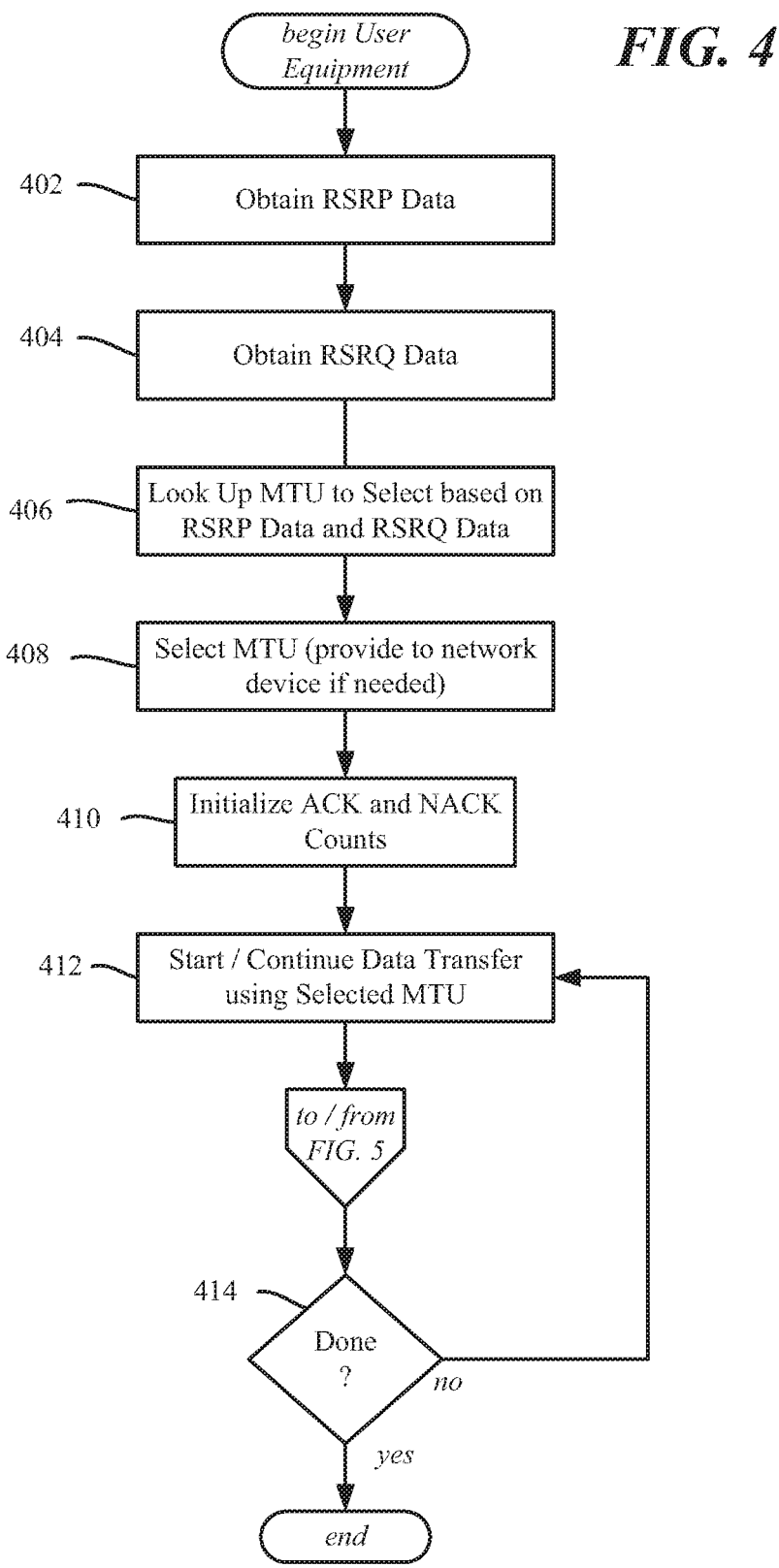
FIGS. 4-6 comprise an example flow diagram of operations of a user equipment, including operations to select (and possibly vary based on performance) an MTU packet size based on radio signal conditions, in accordance with various aspects and implementations of the subject disclosure.
Figure 5:
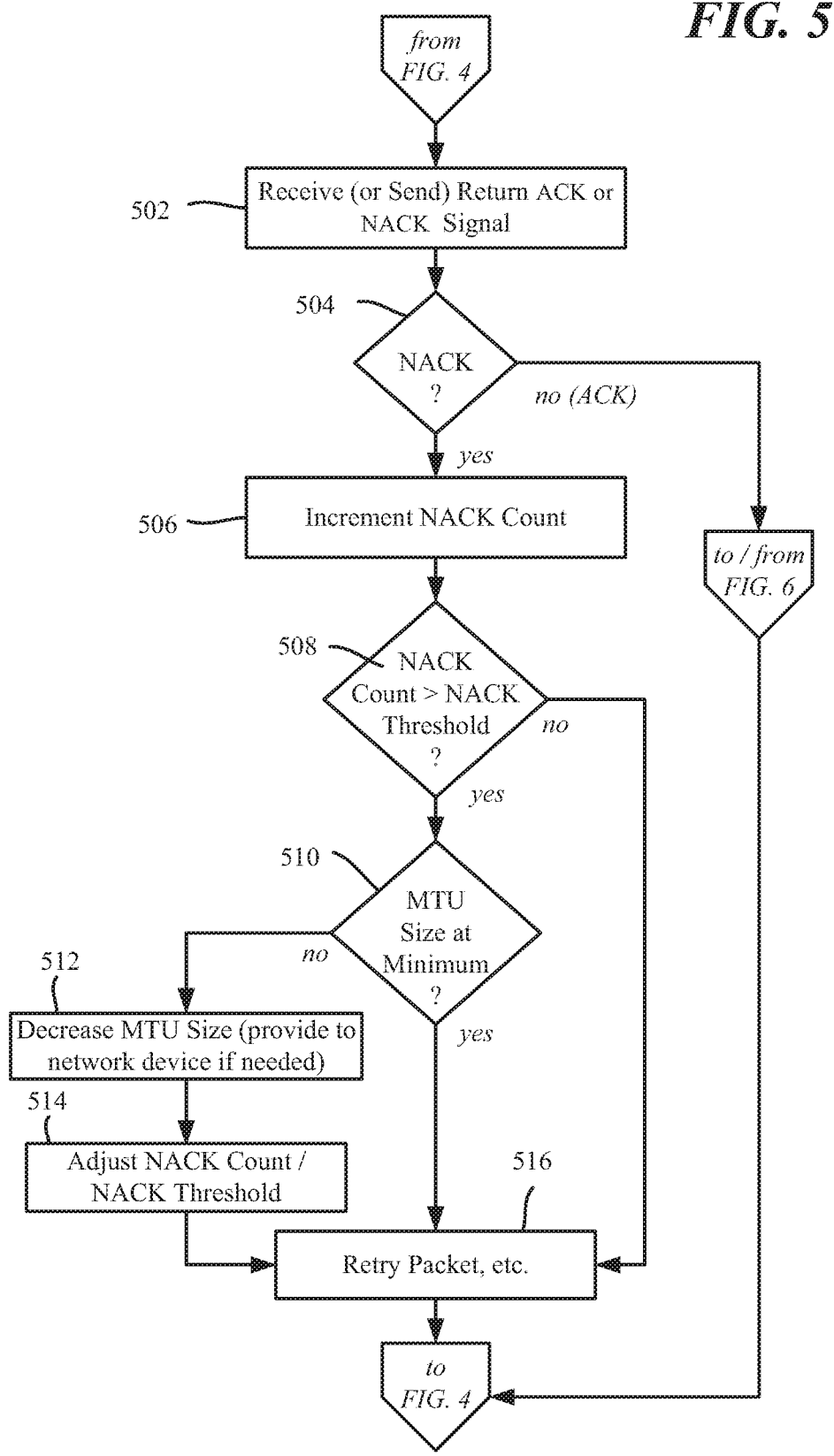
Figure 6:
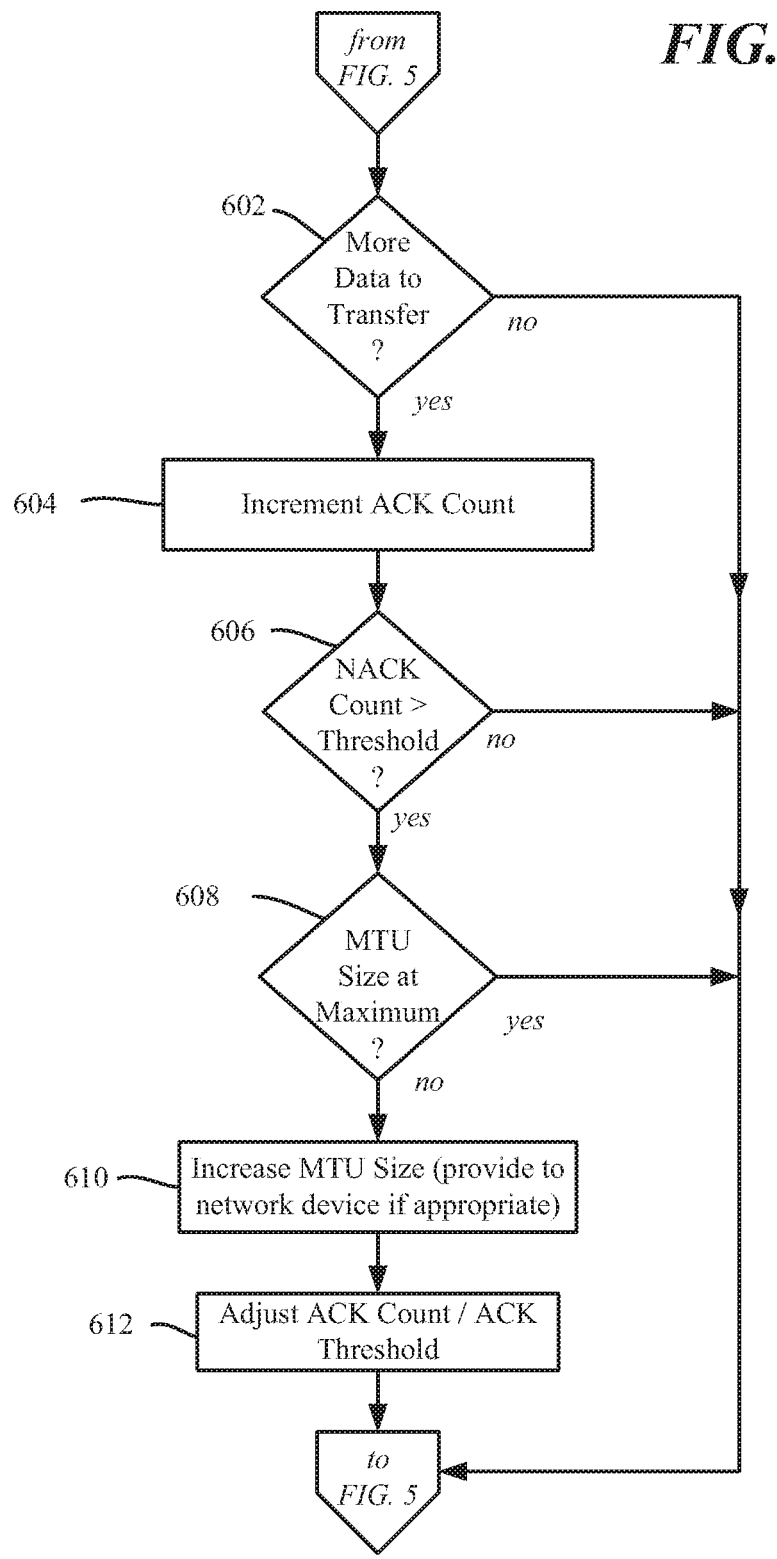

FIGS. 4-6 comprise a flow diagram showing some example operations that a user equipment can perform with respect to selecting an MTU packet size for data transfers. After connecting to a network device and receiving the radio reference signals, operation 402 represents obtaining (measuring) the RSRP data. Operation 404 represents obtaining (e.g. computing) and the RSRQ data.

Operation 406 represents looking up the MTU packet size to select based on the RSRP data and the RSRQ data. Operation 408 represents selecting the MTU, and if appropriate, providing the selected MTU packet size to the network device.

As will be understood, in one or more implementations, the selected MTU packet size can be varied from what is stored in the table, such as for the next file download/upload, by adding/subtracting a delta value from the stored MTU lookup table; (it is also feasible to change the MTU size during a TCP session, however the MTU size is usually set in the first TCP packet header field (SYN and MSS) and remains unchanged afterward). As one straightforward example, the RSRP data and RSRQ data can be re-measured, such as periodically or on demand, and use to select a possibly a different MTU packet size. As another example, as described herein, the actual performance of an upload data transfer can be evaluated, e.g., by tracking ACK and NACK signals corresponding to the success or failure of data packet transfers, respectively. For example, ACK and NACK signals can be counted and if the performance of the data transfer is good, the MTU packet size can be increased for subsequent data transfer sessions. Conversely, if the performance of the data transfer is poor, the MTU packet size can be decreased for subsequent data transfer sessions. Thus, in one or more example implementations, counts of the ACK and NACK signals can be used to track performance of a data transfer operation. Operation 410 initializes (e.g., zeroes) these counts.

Operation 412 represents starting (or if already started, continuing) the data transfer, e.g., sending or receiving some portion of the data. The operations continue as represented in the flow diagram of FIG. 5 until the data transfer is done (operation 414), including when successfully completed or because of failure.

Operation 502 of FIG. 5 represents receiving (or if downloading, sending) an ACK or NACK signal. For a NACK, operation 504 branches to operation 506, while for an ACK, operation 504 branches to the operations of FIG. 6, described below.

Operation 506 represents incriminating the NACK count, and operation 508 evaluates the NACK count against a NACK count threshold value. Note that the threshold value can be determined via field testing or the like, and can be such that even a single NACK is considered to be indicative of a need for a smaller MTU packet size, if possible. Further note that the NACK threshold value in use can differ for uploads versus downloads, and can be changed based on the current MTU packet size and/or other factors. For example, the threshold value can allow for more aggressive or less aggressive changes in the MTU packet size in use based on whether the current MTU packet size is already near the lower end or upper end, whether the RSRP and/or RSRQ were closer to one end of a range versus closer to the center of the range, whether there already has been an adjustment (or adjustments) to the MTU packet size for a next TPC session, and so on.

Operation 510 evaluates whether the MTU size is already at the minimum possible size. If not, operation 512 decreases the MTU size, e.g., by 100 bytes, which can be reported to the network device, if appropriate. Note that in one or more implementations this decrease adjustment is for the next TCP session, (although as set forth above, in alternative implementations the adjustment can be within the current session). Operation 514 represents adjusting the NACK count (e.g., such as re-zeroing the count) and/or adjusting the NACK threshold value in anticipation of a next NACK, if any. Note that ACK counts and NACK counts can be related, e.g., as little as a single NACK can reset the ACK count, or some number of ACK(s) can reset the NACK count. Operation 516 represents performing appropriate actions to re-send a "NACK'ed" packet, or waiting to re-receive a packet; (or failing the data transfer, if appropriate). The process returns to FIG. 4 to repeat data transfer until successful or failed at operation 414.

FIG. 6 represents the general, example operations when an ACK is received (or sent). If there is more data to transfer, operation 602 branches to operation 604, otherwise the process returns to end the data transfer operations (successfully, at operation 414).

Operation 604 represents incrementing the ACK count, which is evaluated at operation 606. If the threshold value is exceeded, then the data transfer performance is good, and the MTU size can be increased for the next TCP session (and reported to the network device, if appropriate). For example, some number (e.g., ten) successive ACKs (e.g., without an intervening NACK) can indicate good performance.

If good performance is determined and the MTU size is not already at the maximum size (operation 608), operation 610 increases the MTU size, e.g., by 100 bytes. Operation 612 represents adjusting the ACK count and/or ACK threshold value, (similar to what was described above with respect to operation 514 of FIG. 5), in anticipation of one or more future ACKs.

Figure 7:
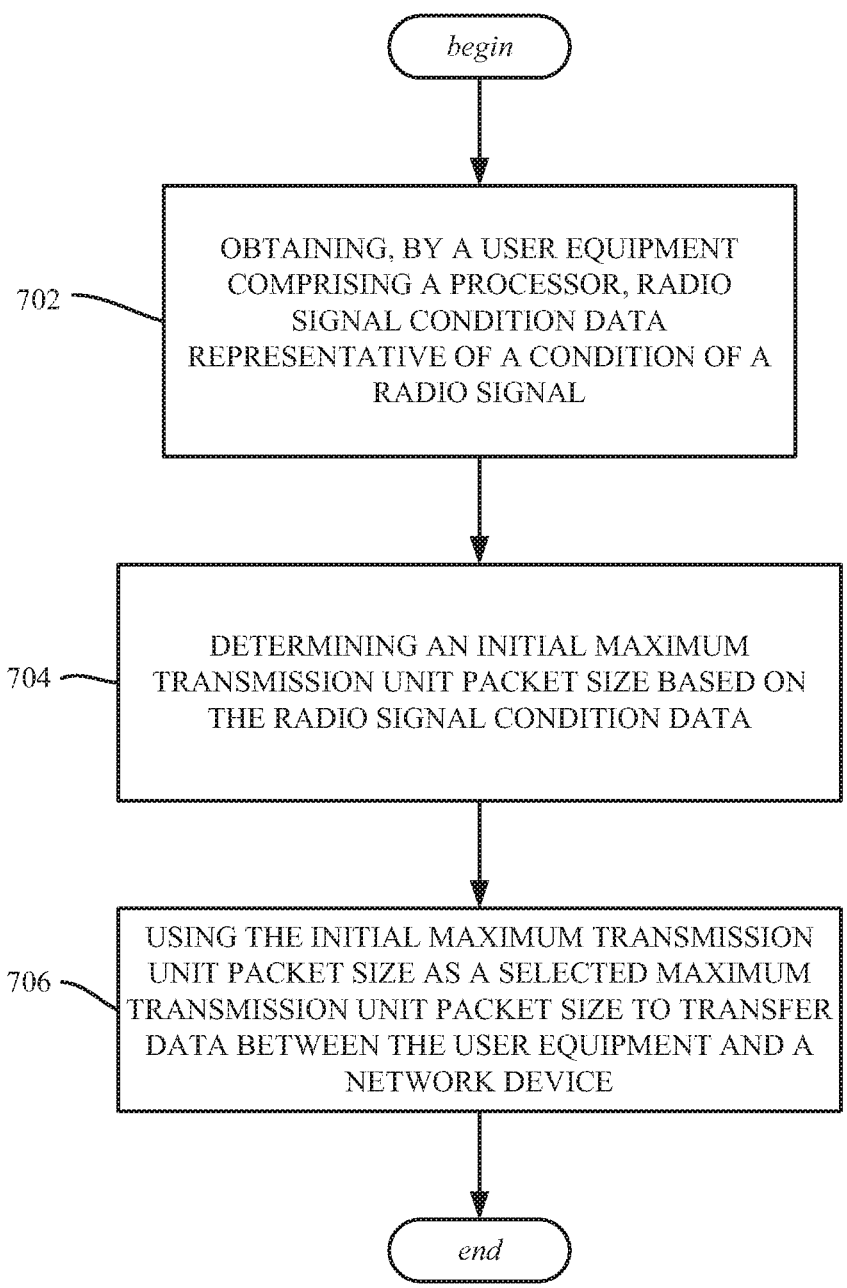
FIG. 7 illustrates an example flow diagram of a user equipment's example operations for selecting an MTU packet size based on received reference signals, in accordance with various aspects and implementations of the subject disclosure.

FIG. 7 represents general, example operations of a user equipment 102.

Operation 702 represents obtaining, by a user equipment comprising a processor, radio signal condition data representative of a condition of a radio signal. Operation 704 represents determining, by the user equipment, an initial maximum transmission unit packet size based on the radio signal condition data. Operation 706 represents using, by the user equipment, the initial maximum transmission unit packet size as a selected maximum transmission unit packet size to transfer data between the user equipment and a network device.

Obtaining the radio signal condition data can comprise measuring reference signal received power data corresponding to a power of a reference signal and determining reference signal received quality data corresponding to a received quality of the reference signal.

Determining the initial maximum transmission unit packet size can comprise using the reference signal received power data and the reference signal received quality data to retrieve the initial maximum transmission unit packet size from a data store of predetermined initial maximum transmission unit packet sizes.

Aspects can comprise populating the data store of predetermined maximum transmission unit packet sizes, comprising selecting maximum transmission unit packet sizes for inclusion in the data store based on determining transmission control protocol IP packet retransmission rates and determining transmission control protocol session time out rates at a cell edge, as a function of respective received powers and respective received qualities, for respective reference signals of a group of candidate maximum transmission unit packet sizes.

Aspects can comprise determining, by the user equipment, that a negative acknowledgement count applicable to packet transmissions is below a threshold value, and in response to the determining that the negative acknowledgement count is below the threshold value, increasing the selected maximum transmission unit packet size to an increased maximum transmission unit packet size, and using the increased maximum transmission unit packet size to transfer subsequent data (e.g., in a next TCP session) between the user equipment and the network device.

Aspects can comprise determining, by the user equipment, that a negative acknowledgement count applicable to packet transmissions is above a threshold value, and in response to the determining that the negative acknowledgement count is above the threshold value, decreasing the selected maximum transmission unit packet size to a decreased maximum transmission unit packet size, and using the decreased maximum transmission unit packet size to transfer data between the user equipment and the network device, e.g., in a subsequent file transfer.

Using the selected maximum transmission unit packet size to transfer the data between the user equipment and the network device can comprise using the selected maximum transmission unit packet size to transfer the data between a category-M device and the network device.

Figure 8:
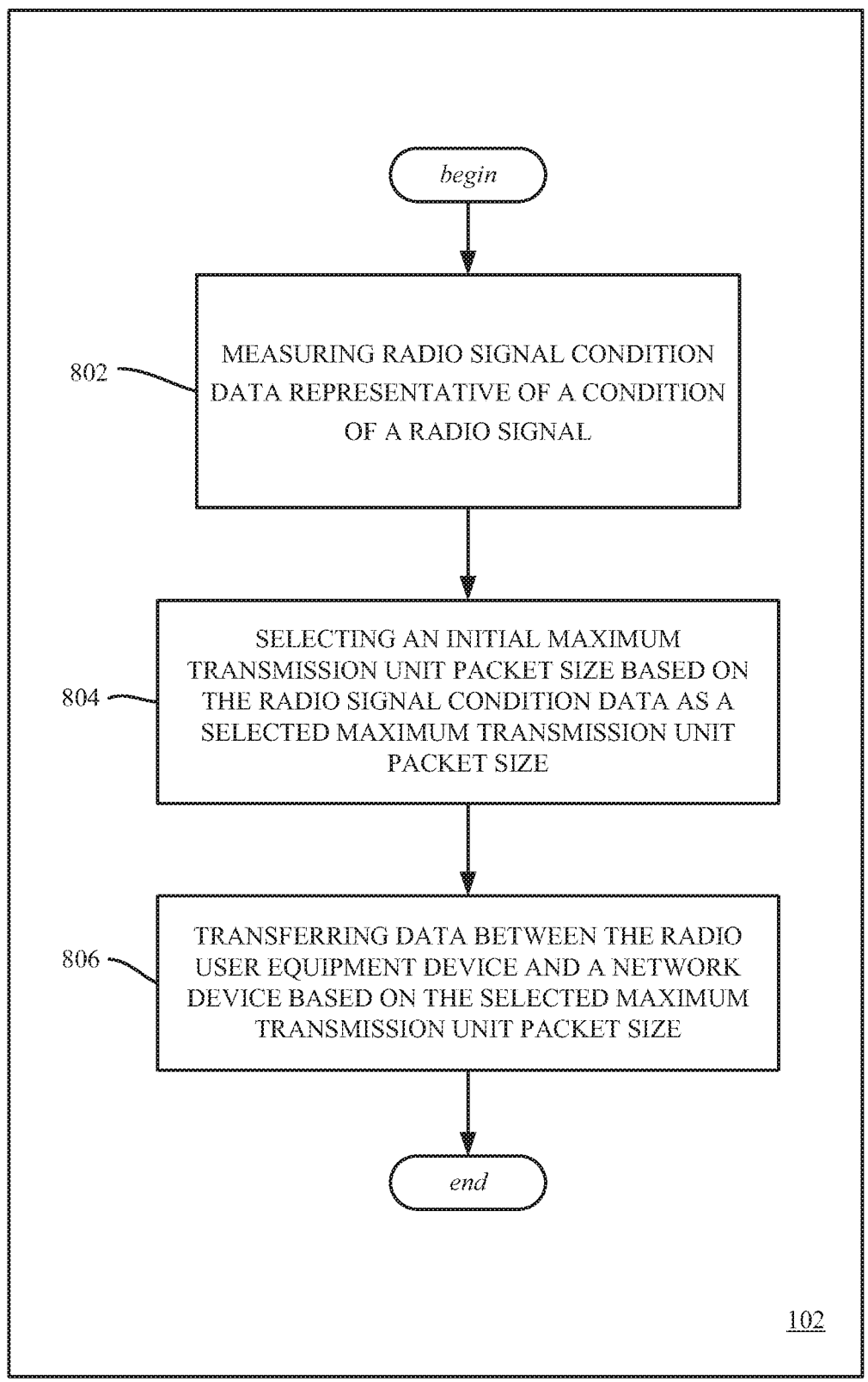
FIG. 8 illustrates a block diagram of a user equipment's example operations, comprising operations for selecting an MTU packet size based on received reference signals, in accordance with various aspects and implementations of the subject disclosure.

FIG. 8 is a block diagram of a radio user equipment device 102, comprising processor; and a memory that stores executable instructions that, when executed by the processor, facilitate performance of operations. Example operations comprise measuring radio signal condition data representative of a condition of a radio signal (operation 802) and selecting an initial maximum transmission unit packet size based on the radio signal condition data as a selected maximum transmission unit packet size (operation 804). Operation 806 represents transferring data between the radio user equipment device and a network device based on the selected maximum transmission unit packet size.

Measuring the radio signal condition data can comprise measuring a received power of a reference signal and determining a received quality of the reference signal. Selecting the initial maximum transmission unit packet size can comprise retrieving the initial maximum transmission unit packet size from a data store of predetermined initial maximum transmission unit packet sizes via a first lookup index based on the received power of the reference signal and a second lookup index based on the received quality of the reference signal.

Aspects can comprise changing the selected maximum transmission unit packet size based on actual performance measurement data with respect to transferring the data, e.g., in a subsequent data transfer session. Changing the selected maximum transmission unit packet size based on the actual performance measurement data can comprise tracking negative acknowledgments received with respect to transferring the data. Changing the selected maximum transmission unit packet size based on the actual performance measurement data can comprise increasing the selected maximum transmission unit packet size. Changing the selected maximum transmission unit packet size based on the actual performance measurement data can comprise decreasing the selected maximum transmission unit packet size.

The radio user equipment device can comprise a category-M device.

Figure 9:
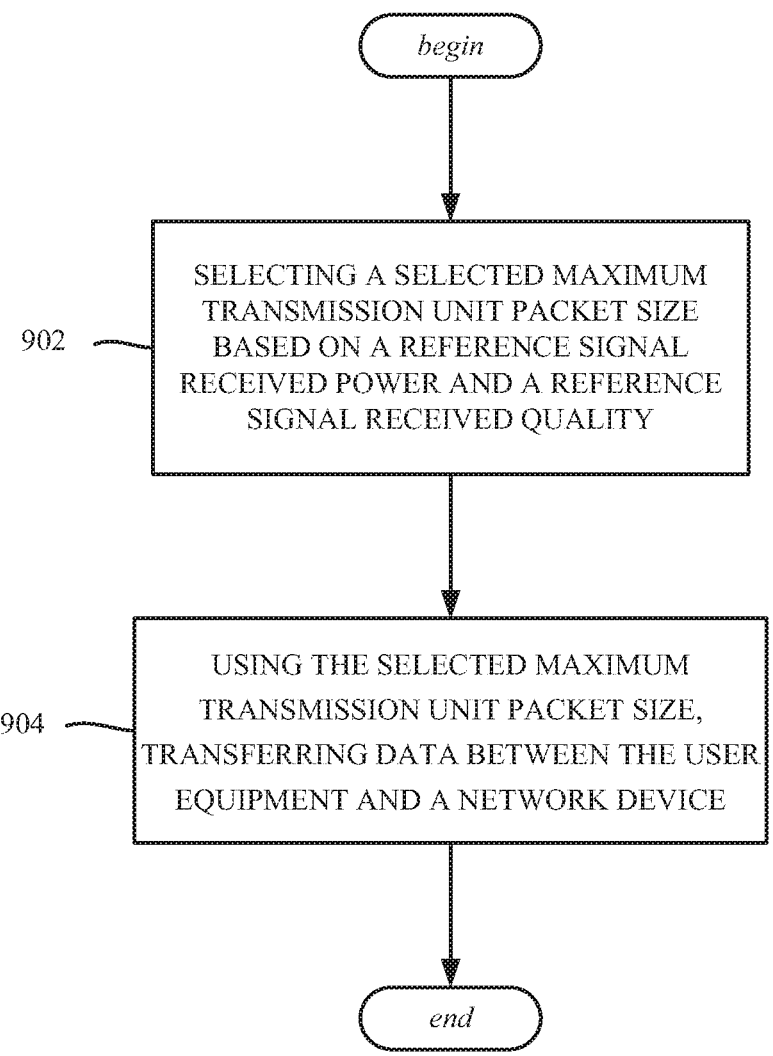
FIG. 9 illustrates an example flow diagram of a user equipment's example operations for selecting an MTU packet size based on received reference signals, in accordance with various aspects and implementations of the subject disclosure.

FIG. 9 represents general, example operations of a machine-readable storage medium, comprising executable instructions that, when executed by a processor of a user equipment, facilitate performance of operations. Example operations can comprise selecting a selected maximum transmission unit packet size based on a reference signal received power and a reference signal received quality (operation 902), and using the selected maximum transmission unit packet size, transferring data between the user equipment and a network device operation 904).

Aspects can comprise determining the reference signal received power and determining the reference signal received quality at the user equipment, and retrieving the selected maximum transmission unit packet size from a data store of predetermined initial maximum transmission unit packet sizes via a first lookup index based on the reference signal received power and a second lookup index based on the reference signal received quality.

Aspects can comprise changing the selected maximum transmission unit packet size to a changed maximum transmission unit packet size based on a result of tracking negative acknowledgments received with respect to transferring the data. Changing the selected maximum transmission unit packet size can comprise increasing the selected maximum transmission unit packet size, e.g., for a subsequent data transfer session. Changing the selected maximum transmission unit packet size can comprise decreasing the selected maximum transmission unit packet size, e.g., for a subsequent data transfer session.

As can be seen, described herein is dynamically selecting the MTU size based on radio signal quality, to reduce TCP round trip time and thereby improve machine-type (and other type) device communication performance. The technology reduces the TCP packet retransmission rate and session time out rate, and consequently improves the data download/upload success rate. The technology thus improves Cat-M device reliability.

Figure 10:
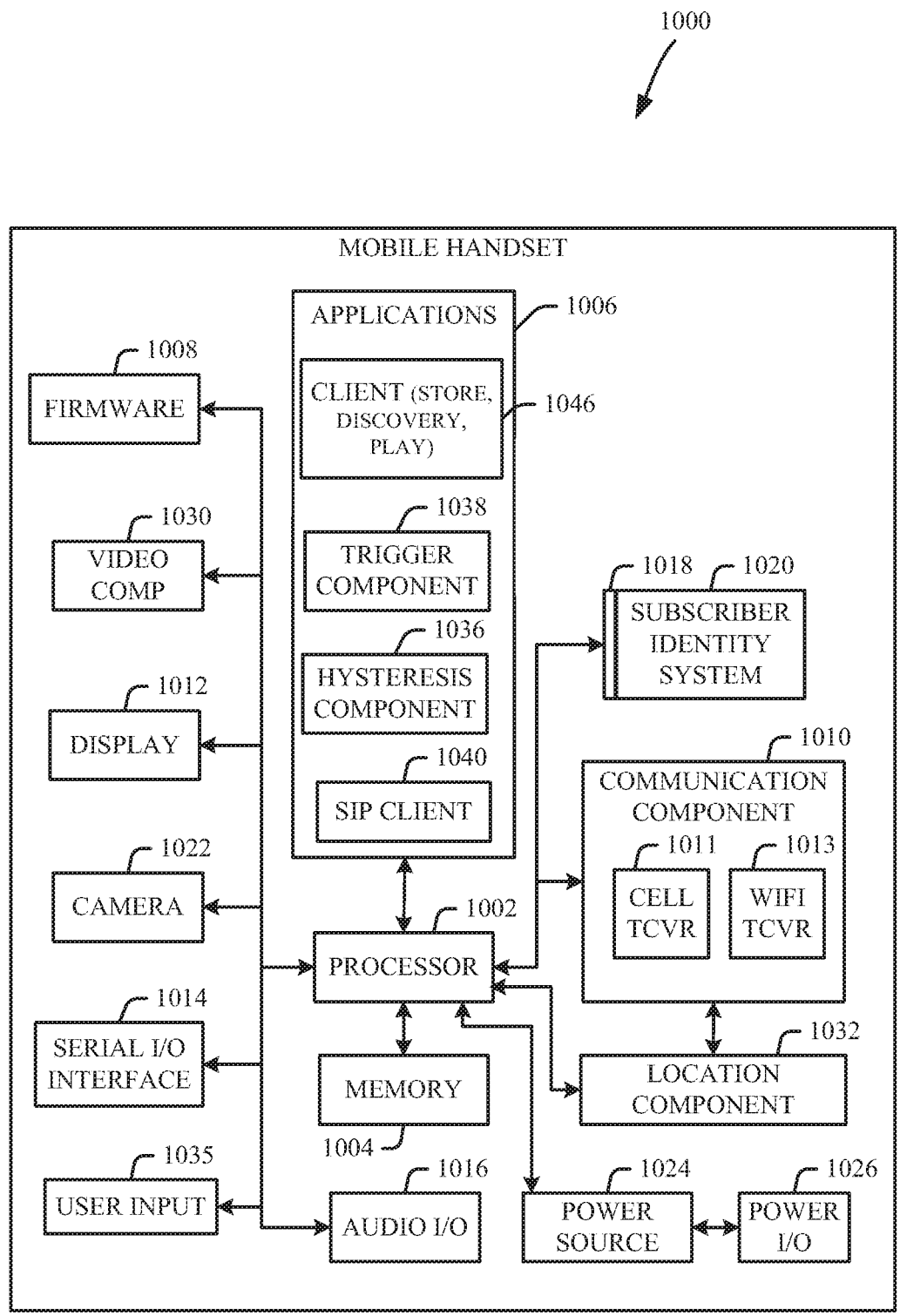
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1011 (e.g., Wi-Fi, WiMax) for corresponding signal communications.

The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1010 for displaying text, images, video, telephony functions (e.g., a Caller ID function), setup functions, and for user input. For example, the display 1010 can also be referred to as a "screen" that can accommodate the presentation of multimedia content (e.g., music metadata, messages, wallpaper, graphics, etc.). The display 1010 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1011 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1011 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
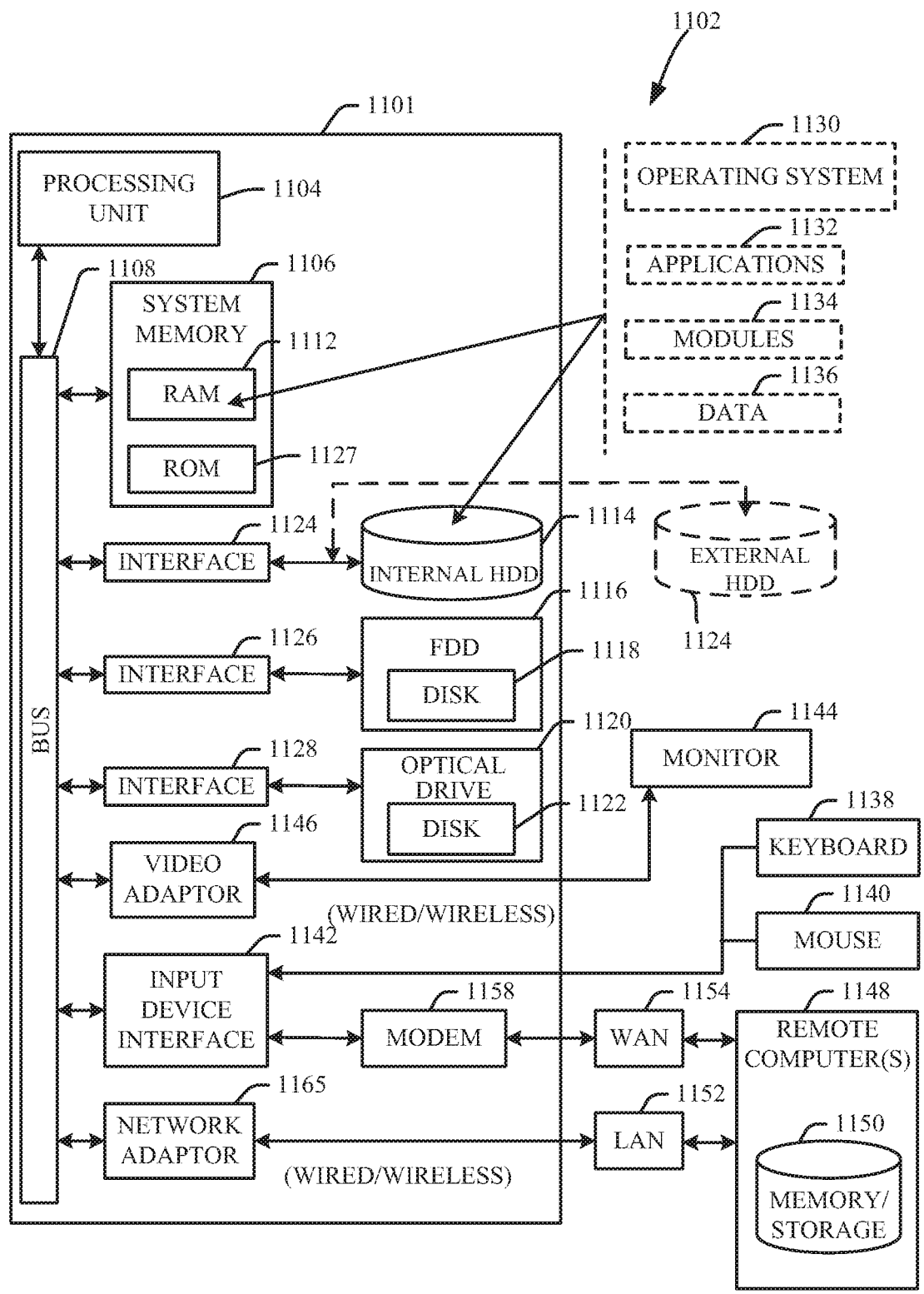
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1100 (see below), non-volatile memory 1102 (see below), disk storage 1104 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1110, which can be, for example, part of the hardware of system 1100, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 can include volatile memory 1100 and nonvolatile memory 1102. A basic input/output system (BIOS), containing routines to transfer information between elements within computer 1110, such as during start-up, can be stored in nonvolatile memory 1102. By way of illustration, and not limitation, nonvolatile memory 1102 can include ROM, PROM, EPROM, EEPROM, or flash memory. Volatile memory 1100 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1110 can also include removable/non-removable, volatile/non-volatile computer storage media. FIG. 11 illustrates, for example, disk storage 1104. Disk storage 1104 includes, but is not limited to, devices like a magnetic disk drive, floppy disk drive, tape drive, flash memory card, or memory stick. In addition, disk storage 1104 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1104 to system bus 1118, a removable or non-removable interface is typically used, such as interface 1106.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1108. Operating system 1108, which can be stored on disk storage 1104, acts to control and allocate resources of computer system 1110. System applications 1130 take advantage of the management of resources by operating system 1108 through program modules 1132 and program data 1134 stored either in system memory 1116 or on disk storage 1104. It is to be noted that the disclosed subject matter can be implemented with various operating systems or combinations of operating systems.

A user can enter commands or information into computer 1110 through input device(s) 1136. As an example, a mobile device and/or portable device can include a user interface embodied in a touch sensitive display panel allowing a user to interact with computer 1110. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1110 and to output information from computer 1110 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1110 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1110.

For purposes of brevity, only a memory storage device 1146 is illustrated with remote computer(s) 1144. Remote computer(s) 1144 is logically connected to computer 1110 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1110, it can also be external to computer 1110. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
obtaining, by a user equipment comprising a processor, radio signal condition data representative of a condition of a radio signal;
determining, by the user equipment, an initial maximum transmission unit packet size based on the radio signal condition data, wherein the determining the initial maximum transmission unit packet size comprises using reference signal received power data and reference signal received quality data associated with the radio signal condition data to retrieve the initial maximum transmission unit packet size from a data store of predetermined initial maximum transmission unit packet sizes, and wherein the data store of predetermined initial maximum transmission unit packet sizes is populated based on selecting initial maximum transmission unit packet sizes for inclusion in the data store based on determining transmission control protocol IP packet retransmission rates and determining transmission control protocol session time out rates at a cell edge, as a function of respective received powers and respective received qualities, for respective reference signals of a group of candidate initial maximum transmission unit packet sizes; and
using, by the user equipment, the initial maximum transmission unit packet size as a selected maximum transmission unit packet size to transfer data between the user equipment and a network device.

2. The method of claim 1, wherein the obtaining the radio signal condition data comprises measuring the reference signal received power data corresponding to a power of a reference signal and determining the reference signal received quality data corresponding to a received quality of the reference signal.

3. The method of claim 1, further comprising determining, by the user equipment, that a negative acknowledgement count applicable to packet transmissions is below a threshold value, and in response to the determining that the negative acknowledgement count is below the threshold value, increasing the selected maximum transmission unit packet size to an increased maximum transmission unit packet size, and using the increased maximum transmission unit packet size to transfer data between the user equipment and the network device in a subsequent data transfer session.

4. The method of claim 1, further comprising determining, by the user equipment, that a negative acknowledgement count applicable to packet transmissions is above a threshold value, and in response to the determining that the negative acknowledgement count is above the threshold value, decreasing the selected maximum transmission unit packet size to a decreased maximum transmission unit packet size, and using the decreased maximum transmission unit packet size to transfer data between the user equipment and the network device in a subsequent data transfer session.

5. The method of claim 1, wherein the using the selected maximum transmission unit packet size to transfer the data between the user equipment and the network device comprises using the selected maximum transmission unit packet size to transfer the data between a category-M device and the network device.

6. The method of claim 1, wherein the user equipment comprises a category-M device.

7. A radio user equipment device, comprising:
a processor; and
a memory that stores executable instructions that, when executed by the processor, facilitate performance of operations, the operations comprising:
measuring radio signal condition data representative of a condition of a radio signal;
selecting an initial maximum transmission unit packet size based on the radio signal condition data as a selected maximum transmission unit packet size, wherein the selecting the initial maximum transmission unit packet size comprises using reference signal received power data and reference signal received quality data associated with the radio signal condition data to retrieve the initial maximum transmission unit packet size from a data store of predetermined initial maximum transmission unit packet sizes, and wherein the data store of predetermined initial maximum transmission unit packet sizes is populated based on selecting initial maximum transmission unit packet sizes for inclusion in the data store based on determining transmission control protocol IP packet retransmission rates and determining transmission control protocol session time out rates at a cell edge, as a function of respective received powers and respective received qualities, for respective reference signals of a group of candidate initial maximum transmission unit packet sizes; and
transferring data between the radio user equipment device and a network device based on the selected maximum transmission unit packet size.

8. The radio user equipment device of claim 7, wherein the measuring the radio signal condition data comprises measuring the reference signal received power data corresponding to a power of a reference signal and determining the reference signal received quality data corresponding to a received quality of the reference signal.

9. The radio user equipment device of claim 7, further comprising, changing the selected maximum transmission unit packet size for a subsequent data transfer session based on actual performance measurement data with respect to transferring the data in a current data transfer session.

10. The radio user equipment device of claim 9, wherein the changing the selected maximum transmission unit packet size based on the actual performance measurement data comprises tracking negative acknowledgments received with respect to transferring the data.

11. The radio user equipment device of claim 9, wherein the changing the selected maximum transmission unit packet size based on the actual performance measurement data comprises increasing the selected maximum transmission unit packet size.

12. The radio user equipment device of claim 9, wherein the changing the selected maximum transmission unit packet size based on the actual performance measurement data comprises decreasing the selected maximum transmission unit packet size.

13. The radio user equipment device of claim 9, wherein the radio user equipment device comprises a category-M device.

14. A non-transitory machine-readable storage medium, comprising executable instructions that, when executed by a processor of a user equipment, facilitate performance of operations, the operations comprising:
selecting a selected maximum transmission unit packet size from a data store of predetermined maximum transmission unit packet sizes based on a reference signal received power and a reference signal received quality, wherein the data store of predetermined maximum transmission unit packet sizes is populated based on selecting maximum transmission unit packet sizes for inclusion in the data store based on determining transmission control protocol IP packet retransmission rates and determining transmission control protocol session time out rates at a cell edge, as a function of respective received powers and respective received qualities, for respective reference signals of a group of candidate maximum transmission unit packet sizes; and
using the selected maximum transmission unit packet size, transferring data between the user equipment and a network device.

15. The non-transitory machine-readable storage medium of claim 14, wherein the operations further comprise determining the reference signal received power and determining the reference signal received quality at the user equipment.

16. The non-transitory machine-readable storage medium of claim 14, wherein the operations further comprise changing the selected maximum transmission unit packet size to a changed maximum transmission unit packet size for a subsequent data transfer session based on actual performance measurement data with respect to transferring the data in a current data transfer session.

17. The non-transitory machine-readable storage medium of claim 16, wherein the changing the selected maximum transmission unit packet size comprises increasing the selected maximum transmission unit packet size.

18. The non-transitory machine-readable storage medium of claim 16, wherein the changing the selected maximum transmission unit packet size comprises decreasing the selected maximum transmission unit packet size.

19. The non-transitory machine-readable storage medium of claim 16, wherein the changing the selected maximum transmission unit packet size based on the actual performance measurement data comprises tracking negative acknowledgments received with respect to transferring the data.

20. The non-transitory machine-readable storage medium of claim 14, wherein the transferring the data between the user equipment and the network device comprises using the selected maximum transmission unit packet size to transfer the data between a category-M device and the network device.

* * * * *